324-77 CROSS REFERENCE SEARCH ROOM

Jan. 6, 1970 T. P. SIFFERLEN 3,488,635

PRECESSIONAL DELAY LINE TIME COMPRESSION CIRCUIT

Filed Feb. 1, 1967

INVENTOR
THOMAS P. SIFFERLEN
BY Irving S. Rappaport
ATTORNEY 3,488,635
Patented Jan. 6, 1970

3,488,635

PRECESSIONAL DELAY LINE TIME COMPRESSION CIRCUIT

Thomas P. Sifferlen, Barrington, R.I., assignor to Raytheon Company, Lexington, Mass., a corporation of Delaware Filed Feb. 1, 1967, Ser. No. 613,332
Int. Cl. G11b 9/00; G06f 15/34
U.S. Cl. 340—173 6 Claims

ABSTRACT OF THE DISCLOSURE

A precessional delay line time compression circuit (deltic) for use in signal correlation in a sonar or communications system comprising a delay line for storing and time compressing a reference signal and a one-bit or integral number of bits delay feedback circuit for introducing a one-bit delay into the reference signal delay line during the correlation process thereby eliminating the need for an additional delay line to achieve correlation.

The invention herein described was made in the course of or under Government contract or subcontract thereunder with the Department of the Navy.

BACKGROUND OF THE INVENTION

The present invention relates to a time compression storage circuit of the type employing a delay line, wherein a varying electrical input signal is sampled at a fixed time interval and the information bits circulated at reduced time intervals in a closed path through the delay line so as to provide at the output a time compressed signal corresponding to the original input signal. Such a time compression storage circuit has particular application to deltic correlator circuits, as for example employed in sonar and radar equipment or a more general type of communications system.

A deltic correlator circuit is defined as one in which time compressed signals in digital form are correlated, with the answer to the correlation being supplied in real time. The advantage of this mode of correlation is that an accurate correlation of a large number of information bits may be obtained in a short time.

In time compression storage circuits of the type under consideration, the information bits are normally in digital form, being pulses, each occurring in a given time interval. Each information sample circulates one time through and re-enters the delay line before the succeeding sample is taken and admitted to the delay line, so that successive information bits are circulated and stored in the circuit in successive time intervals. In such storage circuits it is a requirement that the input signal be sampled at a frequency equal to the inverse of the delay time of the path through which the information bits are circulated, which is essentially the delay line period, plus or minus an additional short delay. The latter is the time interval between information bits in the compressed time signal representation which is selected to be a small fraction of the total delay. It is also necessary that the sampling frequency be fixed so that the information bits are spaced by equal intervals to provide an accurate recapitulation of the original signal. It may also be appreciated that a fixed sampling frequency is essential in correlation operations where, e.g., a stored transmitted pulse is correlated with the target return signals for readily detecting low energy return signals, so that identical samples of the signals to be correlated are operated upon.

Prior art deltic correlators used in correlation receivers required the use of three deltics. Such prior art systems employed a signal deltic for providing a time compression storage for the information signal, a reference deltic for providing a time compression storage for the reference signal and a third storage deltic which had an additional delay interval from the reference deltic. After the reference signal was stored in the reference deltic it was serially transferred to the storage deltic. The correlation could be obtained by comparing the stored signals contained in the signal deltic and the storage deltic. Thus, such prior art systems required three deltics in order to accomplish the desired signal correlation.

Another type of prior art system employs only two deltics but utilizes a time-sharing technique. The time-sharing technique is accomplished by using a single deltic to store both the reference signal and the information signal. Once the reference signal is stored in the time-shared deltic, it is serially transferred into a storage deltic which is one-bit longer than the time-shared deltic. The time-shared deltic is then utilized to correlate the information signal contained therein with the stored reference signal in the storage deltic. However, such a system suffers from the disadvantage of being adaptable only to an echo ranging system. It could not be utilized in a general type of communication system unless the system was limited to a fixed reference signal. If it would be desired to vary the reference signal the time-sharing technique could not be employed. Another disadvantage of the time-sharing technique is that the system requires relatively complex switching circuitry in order to permit time-sharing of a single deltic.

An object of the present invention is to overcome the disadvantages of the prior art by providing an improved precessional deltic which eliminates the requirement for complex switching circuitry to accomplish signal correlation. A further object of the present invention is to provide a precessional deltic for use in a signal correlation system which requires fewer deltics.

SUMMARY OF THE INVENTION

The above objects and advantages of this invention are accomplished by providing a correlation receiving system for achieving signal correlation between a reference signal and an information signal, said system comprising a first delay line for storing and time compressing an information signal; a second delay line for storing and time compressing a reference signal, said second delay line having the same delay as said first delay line during the time that the reference signal is being written into the second delay line; a one-bit delay feedback circuit connected to said second delay line for introducing a one-bit interval delay in the reference signal in order to achieve the required precession between the information and reference signals during correlation; and a correlation detector connected to the first and second delay lines for detecting signal correlation between the information and reference signals.

More particularly, the objects and advantages of the present invention are accomplished by providing a precessional delay line time compression circuit comprising a delay line for receiving a reference signal, said delay line storing and time compressing said signal; means for writing-in the reference signal into said delay line; circuit means for permitting said reference signal to continuously circulate through said delay line as said reference signal is being written into said delay line; means for inhibiting said writing-in means when said delay line is completely filled wth said reference signal; means located in the feedback path of said delay line for introducing a one-bit delay interval into said circulating reference signal for achieving the necessary precession between the reference signal and any other signal between which it is desired to provide signal correlation.

DESCRIPTION OF THE PREFERRED EMBODIMENT

Figures 1, 2:
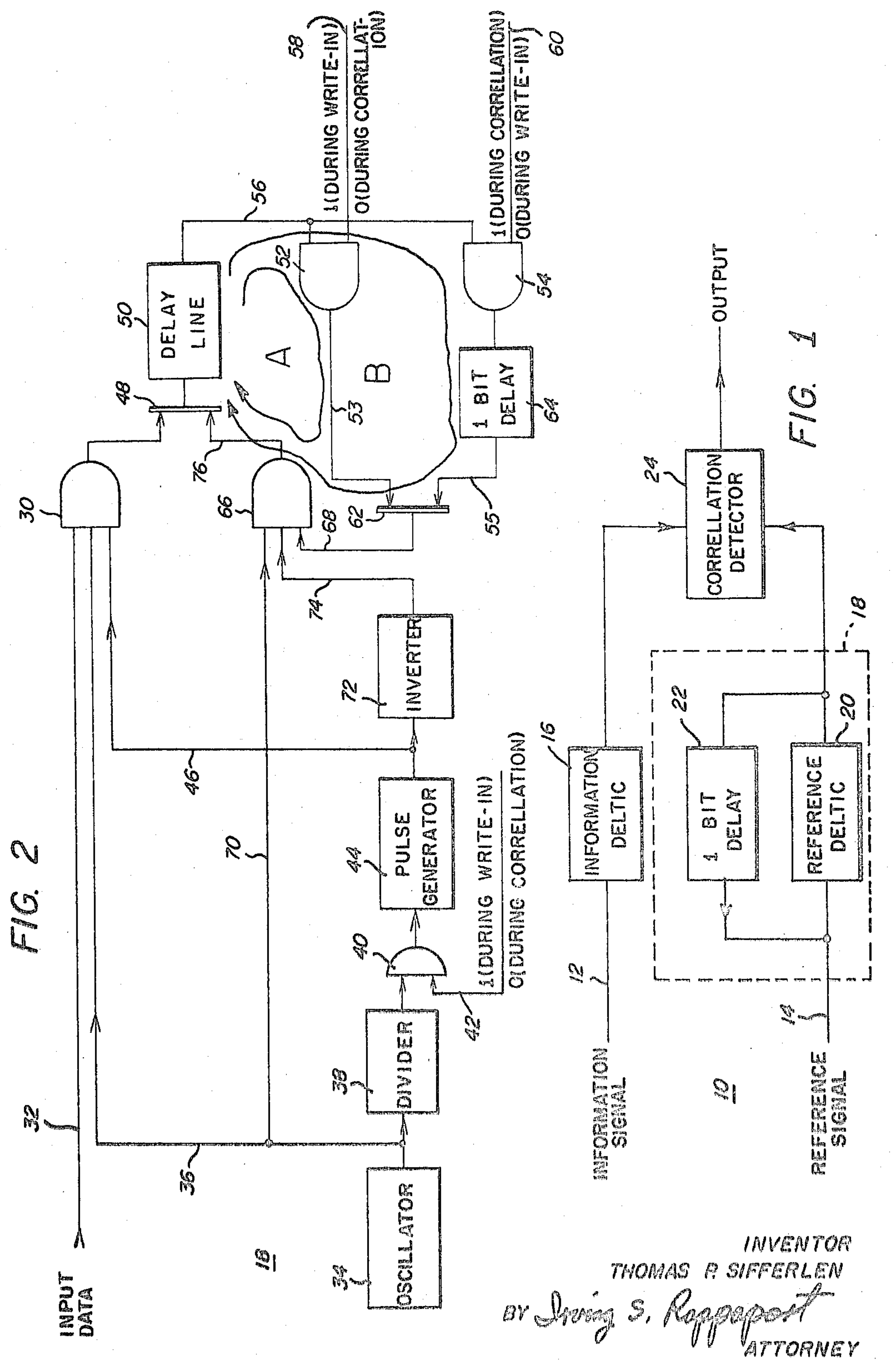
FIG. 1 shows a block diagram of a signal correlation system employing the present invention.
FIG. 2 shows a block diagram of a preferred embodiment of a precessional deltic of the present invention.

FIG. 1 shows a signal correlation system 10 which includes an information signal input line 12 and a reference signal input line 14. The signal correlation system 10 may be employed in sonar and radar equipment or may be utilized in a more general type of communications system. The information signal applied to input line 12 may be an echo such as is found in a sonar system or may be a direct path information signal. The information signal applied to input line 12 is fed to an information deltic 16 while the reference signal is applied to a precessional deltic 18 (outlined in a dotted block). The precessional deltic 18 includes a reference deltic 20 which has a feedback path including a one-bit delay 22. The output signals from the information deltic 16 and the reference deltic 20 are detected in a correlation detector 24. The output of the correlation detector 24 provides the desired signal correlation between the information signal and the reference signal.

The signal correlation system 10 shown in FIG. 1 operates in the following manner. As the incoming information signal is applied to input line 12, it is time compressed and stored in the information deltic 16. The incoming reference signal when applied to input line 14 is time compressed and stored in the reference deltic 20. The reference signal may be sampled to any desired level of quantization. For example, each sample fed to the reference deltic 20 may consist of a one-bit or a three-bit sample. For purposes of this description, a one-bit sample is utilized. During the writing or "filling-up" process in the reference deltic 20, both the reference deltic 20 and the information deltic 16 must have the same delay to achieve the same time compression which is a necessary requisite for a signal correlation system for a lone doppler signal. Once all the samples of the reference signal have been written into the reference deltic 20 further signal input on input line 14 is inhibited. As the reference signal is being written into the reference deltic 20, each sample consisting of one-bit is fed into the reference deltic 20 and then circulates around a closed path. Before the next sample of one-bit is written into the reference deltic 20, the preceding sample advances one-bit interval in the reference deltic. This writing and recirculation process continues until the entire reference deltic 20 is saturated with the samples of the reference signal.

During correlation of the information and reference signals, the delays provided by the information deltic 16 and the reference deltic 20 must differ by at least one-bit interval (or integral number of bit intervals), in order to achieve the required precession between the information and reference signals for the correlation detection. To provide this one-bit delay, the one-bit delay 22 is provided in the feedback path of the reference deltic 20. By introducing this one-bit delay, the precession is achieved and the reference and information signal may be correlated and detected by the correlation detector 24.

FIG. 2 shows a detailed block diagram of the precessional deltic 18 outlined by the dotted block in FIG. 1. In the precessional deltic 18, the reference signal is applied to an And gate 30 via an input line 32. An oscillator 34 is provided as a master clock for all timing synchronization required by the precessional deltic 18. The output from the oscillator 34 is applied to the And gate 30 via a lead 36. The output of the oscillator 34 is also fed to a divider 38 which provides sub-frequencies in synchronism with the master clock timing provided by the oscillator 34. The output from the divider 38 is applied to an And gate 40 and also applied to And gate 40 via a lead 42 is a control signal, which depends upon whether the precessional deltic 18 is in the writing or correlation mode of operation. The And gate 40 is used to inhibit the write-in of any reference signal into the precessional deltic 18 during the correlation mode of operation. A signal which passes through the And gate 40 triggers a pulse generator 44, which provides timing pulses to the And gate 30 via a lead 46. These timing pulses are at the sub-frequency rate so as to allow the reference signal to pass through the And gate 30 into the deltic.

When a signal passes through the And gate 30 it is applied to an Or gate 48 through which the signal passes to a time compression storage delay line 50. The output from the delay line 50 is applied to a pair of And gates 52 and 54 via a lead 56. A control signal is applied to And gate 52 via an input lead 58 while another control signal is applied to And gate 54 via input lead 60. The And gate 52 allows the reference signal to recirculate through the delay line 50 at the same delay interval as that of the information deltic in order to achieve the same time compression as that of the information deltic 16 (not shown in FIG. 2). This same delay interval must be maintained during the time that the reference signal is being time compressed and stored in the delay line 50.

The output from the And gate 52 is applied to an Or gate 62 via a lead 53. The output from the And gate 54 is applied to a one-bit delay 64 whose output is applied to the Or gate 62 via a lead 55. The one-bit delay 64 provides the necessary delay interval between the information and reference signals for the correlation detection.

The output from the Or gate 62 is applied to an And gate 66 via a lead 68. Also applied to the input of the And gate 66 via a lead 70 is the signal from the oscillator 34 which provides a re-clocking pulse which allows synchronized signals to pass through the And gate 66. The output from the pulse generator 44 is applied to an inverter 72 which inverts the pulses from the pulse generator 44 and applies them to the And gate 66 via a lead 74 in order to inhibit the re-circulating reference signal from passing through the And gate 66. The And 66 is inhibited during the writing-in of a bit of the reference signal in order to prevent interference between the write-in of the reference signal and the recirculation of the reference signal through the delay line 50. The output from the And gate 66 is connected to the Or gate 48 via a lead 76.

The operation of the precessional deltic 18 shown in FIG. 2 is as follows: During the write-in mode of operation, the sampled reference signal is applied to the And gate 30 via lead 32. At the same time, a signal from the oscillator 34 is applied to the And gate 30 via lead 36 and a sub-frequency of the pulse frequency from the oscillator 34 is applied from the pulse generator 44 to the And gate 30 via lead 46. With signals on leads 32, 36 and 46, the And gate 30 passes the reference signal which is then passed through the Or gate 48 into the delay line 50. During the write-in a "1" is applied to the And gate 52 via lead 58. The information then contained in the delay line 50 is applied to And gate 52 via lead 56. Thus, the bit of information written-in to the delay line 50 circulates around a closed path A which includes the delay line 50, the And gate 52, the Or gate 62, the And gate 66, the Or gates 48 and back into the delay line 50. The And gate 66 prevents any interference between the circulation of the information already written into the delay line 50 and the write-in of new bits of the reference signal.

After the reference signal has been completely stored in the delay line 50, new control signals are applied to lead 42, lead 58 and lead 60. These control signals permit the precessional deltic 18 to operate in the correlation mode. During ths correlation a "0" is applied to the And gate 40 via lead 42 in order to inhibit the pulse generator 44 so that no signal is applied to the And gate 30 via lead 46. As a result, And gate 30 is prevented from passing any further reference signal bits. A "0" is applied to lead 58 connected to the And gate 52 and a "1" is applied via lead 60 to the And gate 54. In the correlation mode, the reference signal which has been stored and time compressed in the delay line 50 now circulates in a closed path designated B. The closed path B includes the delay line 50, And gate 54, one-bit delay 64, Or gate 62, And gate 66, Or gate 48 and back into the delay line 50. By passing the signal through the one-bit delay 64 the necessary delay interval is introduced so as to achieve the required precession between the information and reference signals for correlation detection.

The delay line 50 shown in FIG. 2 is of the magnetostrictive delay line. However, other types of storage devices such as a magnetic drum or tape may be employed to provide the time compressed signal storage.

The present invention as described may be employed in sonar and radar equipment where it may be desirable to obtain correlation between a reference signal and an echo return. The invention may also be utilized in a communications system where it may be desirable to obtain correlation between a reference signal and a direct path information signal.

Obviously many modifications and variations of the present invention are possible in the light of the above teaching. It is, therefore, to be understood that within the scope of the appended claims the invention may be practiced otherwise than as specifically described.

What is claimed is:

1. A precessional delay line time compression circuit for use in a signal correlation system, said circuit comprising:
  - a delay line for storing and time compressing a reference signal;
  - an input circuit for receiving the reference signal, said input circuit coupled to said delay line for applying the reference signal to said delay line;
  - an oscillator connected to said input circuit, said oscillator providing master timing synchronization;
  - a pulse generator coupled to the output of said oscillator and providing a sub-frequency timing pulse to said input circuit;
  - one closed circuit path connected to said delay line through which said reference signal may continuously circulate as said reference signal is being stored and time compressed in said delay line;
  - means for inhibiting the further storage of said reference signal in said delay line when said delay line is completely filled, said inhibiting means includes an And gate coupled between the output of said oscillator and the input of said pulse generator, said And gate preventing a pulse from the oscillator from triggering the pulse generator when the delay line has been completely filled with sample bits of the reference signal; and
  - another closed circuit path connected to said delay line, said another path including a one-bit delay for introducing a one-bit delay interval into said circulating reference signal in order to provide the required precession between the reference signal and any other signal between which it is desired to provide signal correlation.

2. A precessional delay line time compression circuit as set forth in claim 1 wherein:
  - said one closed circuit path includes an And gate connected to the output of said delay line, an Or gate connected to the output of said And gate and a second And gate connected to the output of said Or gate, the output of said second And gate being coupled to said delay line via a second Or gate.

3. A precessional delay line time compression circuit as set forth in claim 1 wherein:
  - said another closed circuit path includes an And gate connected to the output of said delay line, the output of said And gate being connected to said one-bit delay, an Or gate connected to the output of said one-bit delay, and a second And gate connected to the output of said Or gate, the output of said second And gate being coupled to said delay line via a second Or gate.

4. A precessional delay line time compression circuit for use in a signal correlation system, said circuit comprising:
  - a delay line for storing and time compressing a reference signal;
  - an And gate for receiving the reference signal, said And gate coupled to said delay line for applying the reference signal to said delay line;
  - an oscillator connected to said And gate, said oscillator providing master timing synchronization;
  - a pulse generator coupled to the output of said oscillator and providing a sub-frequency timing pulse to said And gate;
  - one closed circuit feedback path connected to said delay line through which said reference signal may continuously circulate as said reference signal is being stored and time compressed in said delay line, said one closed path including a second And gate connected to the output of said delay line, an Or gate connected to the output of said second And gate and a third And gate connected to the output of said Or gate, the output of said third And gate being coupled to said delay line via a second Or gate;
  - means coupled between the output of said pulse generator and the input of said delay line for preventing interference between the writing-in of the reference signal into the delay line and recirculation of the reference signal around said one closed path;
  - means for inhibiting the further write-in of said reference signal into said delay line when said delay line is completely filled, said inhibiting means including a fourth And gate coupled between the output of said oscillator and the input of said pulse generator, said fourth And gate preventing a pulse from the oscillator from triggering the pulse generator when the delay line has been completely filled with sample bits of the reference signal; and
  - another closed circuit feedback path connected to said delay line, said another closed circuit path including a fifth And gate connected to the output of said delay line, the output of said fifth And gate being connected to a one-bit delay, said one-bit delay introducing a one-bit delay interval into said circulating reference signal in order to provide the required precession between the reference signal and any other signal between which it is desired to provide signal correlation, the output of said one-bit delay being connected to said Or gate and the output of said Or gate being connected to said third And gate, the output of said third And gate being coupled to said delay line via a second Or gate.

5. A precessional delay line time compression circuit as set forth in claim 4 wherein:
  - said means coupled between the output of said pulse generator and the input of said delay line includes an inverter connected to the input of said third And gate for inhibiting the circulation of said reference signal around said one closed path during the write-in of sample bits of the reference signal into the delay line.

6. A method for correlating an information signal with a reference signal comprising:
  - simultaneously writing-in the reference signal into one storage and time compression delay line and the information signal into another storage and time compression delay line;
  - inhibiting further writing-in of the reference signal when it has been completely written into the one delay line;

delaying the reference signal by a one-bit time interval so as to achieve the required precession between the reference and information signals; and detecting the reference and information signals in a correlation detector in order to provide the desired correlation.

References Cited

UNITED STATES PATENTS

| | | | |
|---|---|---|---|
| 2,958,039 | 10/1960 | Anderson | 324—77 |
| 2,978,680 | 4/1961 | Schulte | 340—173 X |
| 3,144,638 | 8/1964 | Hesler et al. | 340—173 |
| 3,164,809 | 1/1965 | Pearce et al. | 340—173 |
| 3,289,154 | 11/1966 | Cunningham | 235—181 X |
| 3,327,062 | 6/1967 | Klund et al. | 328—56 X |

BERNARD KONICK, Primary Examiner

JOSEPH F. BREIMAYER, Assistant Examiner

U.S. Cl. X.R.

235—181; 324—77